R. S. SANBORN.
Coffee Pot.

No. 31,910.  Patented April 2, 1861.

Witnesses:
L. Lowell
F. W. Smith

Inventor:
Rufus S. Sanborn.

UNITED STATES PATENT OFFICE.

RUFUS S. SANBORN, OF SYCAMORE, ILLINOIS.

COFFEE-STEEPER.

Specification of Letters Patent No. 31,910, dated April 2, 1861.

*To all whom it may concern:*

Be it known that I, RUFUS S. SANBORN, of Sycamore, in the county of Dekalb and State of Illinois, have invented a new and Improved Machine for Steeping Ground Coffee or Other Substance, called "Independent Britannia Coffee-Steeper;" and I hereby declare that the following is a full, clear, and exact description of the same, reference being had to the accompanying drawings, and the letters marked thereon, making a part of this specification, and in which—

Figure I, is a perspective view of the machine when together; Fig. II, is the machine divided through the center from top to bottom; Fig. III, is perspective view of tubular handle and perforated center tube when separated from the other part; and Fig. IV, is perforated movable bottom detached from the cup to which it fastens.

The same part is marked by the same letter of reference wherever it occurs.

My invention consists in an independent perforated coffee steeper of the peculiar construction hereinafter particularly described.

Figure 1:
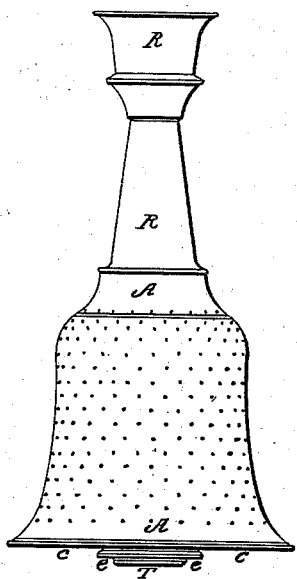
Figure 2:
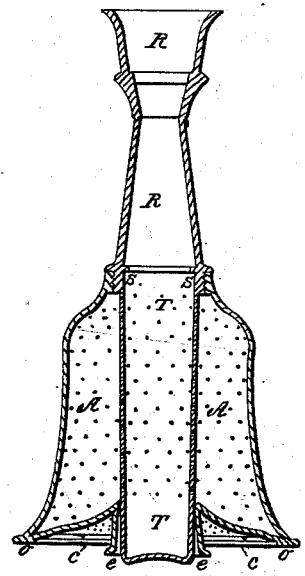
Figure 3:
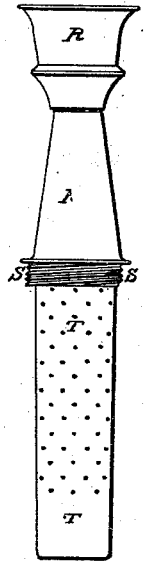
Figure 4:
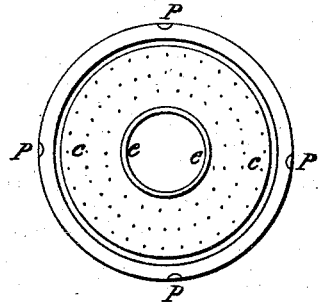

A in the drawing marks a perforated bell shaped cup, into which is screwed at S, a tubular handle R which is continued down in a perforated tube T, to the level of the bottom edge of cup A, or a little below it, as shown in Figs. 1 and 2. In the lower opening of cup A is fitted a movable bottom C which is perforated, like the cup, with small holes, and has at its center a tubular projection *e* which receives the tube T, and serves also as a thumb piece for handling the bottom. Notches P in the bottom C, pass over corresponding spurs in the lower edge of cup A for the purpose of attaching the two parts together when desired.

I make my coffee steeper of britannia block tin, or other metal that will not act chemically upon the coffee so as to modify its color or taste. Perforated tinned iron blackens the coffee and injures its flavor.

. The mode of using the steeper is as follows:—The handle R and tube T being screwed to the cup A at S, the coffee, or other substance to be steeped, is placed in the cavity around the tube T and confined there by attaching the bottom C to the cup. The steeper, thus charged, is placed in a coffee pot or suitable vessel of boiling water, and after it has steeped a while, boiling water is poured into the tube T through the handle R, which completes the operation.

This apparatus makes in a very short time an infusion of coffee perfectly clear, of superior flavor, and free from discoloration.

Having thus fully described the construction and operation of my improved steeper, what I claim, and desire to secure by Letters Patent, is—

1. The combination of the cup A, and perforated tube T, substantially in the manner described.

2. The combination of the tubular handle R with the cup A and tube T substantially as set forth.

RUFUS S. SANBORN.

Witnesses:
L. LOWELL,
F. W. SMITH.